April 10, 1951  R. H. STOUT  2,548,273
INSTRUMENT FOR RESOLVING GEAR RATIOS
Filed Oct. 21, 1946  3 Sheets-Sheet 1

INVENTOR
Russell H. Stout
BY
HIS ATTORNEY

April 10, 1951 R. H. STOUT 2,548,273
INSTRUMENT FOR RESOLVING GEAR RATIOS
Filed Oct. 21, 1946 3 Sheets-Sheet 2

INVENTOR
Russell H. Stout
BY
HIS ATTORNEY

April 10, 1951     R. H. STOUT     2,548,273
INSTRUMENT FOR RESOLVING GEAR RATIOS
Filed Oct. 21, 1946     3 Sheets-Sheet 3

INVENTOR
Russell H. Stout
BY
Wm. G. Blomstran.
HIS ATTORNEY

Patented Apr. 10, 1951

2,548,273

UNITED STATES PATENT OFFICE 2,548,273

INSTRUMENT FOR RESOLVING GEAR RATIOS

Russell H. Stout, Charleston, S. C.

Application October 21, 1946, Serial No. 704,761

11 Claims. (Cl. 235—87)

This invention, in general, relates to an instrument or machine for readily determining the number of gear teeth required in a set of driving and driven gears which will give the correct gear ratios for performing certain definite operations of a machine tool. More particularly, however, the invention contemplates, in this instance, two identical revoluble metallic cylinders having suitably disposed on each of the peripheral surfaces thereof an identical arrangement of numbers or figures which represent pairs of combinations of numbers of gear teeth between 20 and 85, less repetitions, or, 1647 combinations. The combination of numbers on one cylinder together with those on the other cylinder will give over 2,700,000 such combinations within the range with no "Repeats."

The invention further contemplates means for making electrical connection adjacent to, and associated with, each pair of numbers on each of the cylinders when the proper combination of pairs of numbers (which represent the number of teeth required in the driving gears and the associate driven gears) of teeth in the set of driving and driven gears which gives a required ratio of gearing.

The invention further contemplates a suitable revolution counter suitably arranged in connection with suitable gearing arranged in cooperative relation to each of the two cylinders. The counter being adapted to aid in the setting of one of the above-mentioned cylinders to the logarithmic equivalent of the desired ratio.

The invention further contemplates the provision of an electrical circuit helically disposed, of a uniform pitch, throughout the circumference of each of the cylinders. The circuit, including raised or radial projections, is disposed correlatively adjacent to each pair of numbers as arranged on the cylinders. The electrical circuit being so arranged, includes an electric lamp, an electric switch for opening or closing the circuit, and a push button switch which provides for making a test to ascertain whether or not the lamp will light, or whether or not the electric current is being supplied from, for instance, a flash light battery. The device also includes a worm or screw, associated with each cylinder, which carries a carriage which provides means for making electrical connections to and between the raised or radial projections, or from the projections on one cylinder to those on the associate other cylinder when the proper combinations of numbers, which represent the exact ratio of gearing to be used in a set of driving and driven gears, have been reached as indicated by the electric lamp being lighted.

Another feature in the invention provides means for preventing the cylinders from being rotated either singly or together, or releasing one cylinder while the other cylinder is being held from rotation, or visa versa, or releasing the cylinders so that they may be rotated simultaneously and in unison, or singly in combination with the revolution counter.

The above mentioned objects or features of the invention may be better understood by referring to the illustrations shown in the accompanying drawings, and more fully described in the following specification, and more particularly pointed out in the appended claims.

Illustrated in the accompanying drawings.

In the several illustrations similar characters refer to similar parts throughout the several views.

Figure 1:
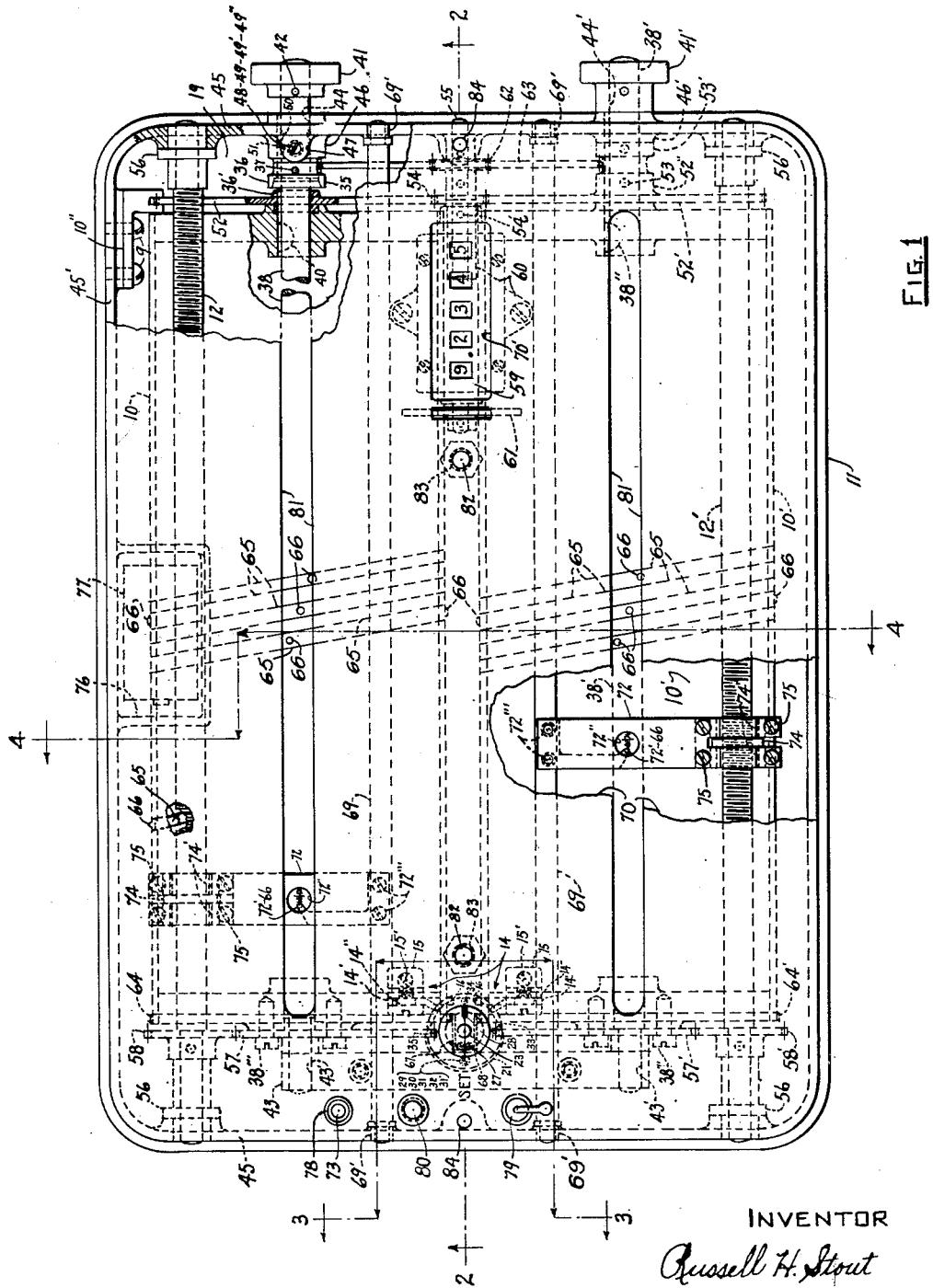
Figure 1 is a top plan view of the invention showing the improvements as embodied therein; portions thereof being broken away and shown in section.
Figure 2:
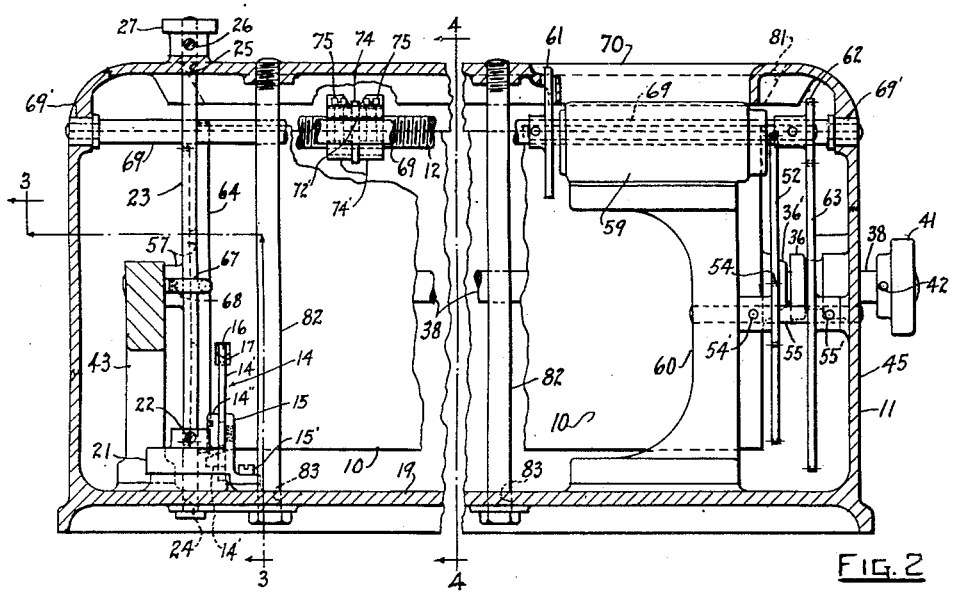
Figure 2 is a view as seen, substantially, on the plane 2—2, of Figure 1.
Figure 4:
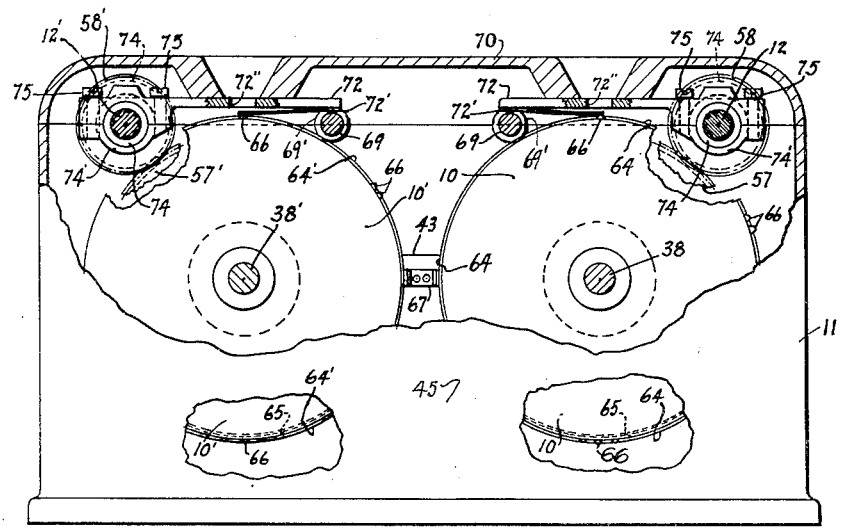
Figure 4 is a partial transverse section taken on the plane 4—4, of Figures 1 and 2, showing the relation of the worms or screws, and the carriages which carries a portion of the electrical conductors, to the cylinders on which the helical electrical conductor and the pairs of numbers are arranged as above mentioned.

Essentially, the invention contemplates two substantially identical revoluble metallic cylinders 10, and 10', arranged in parallel relation to each other and suitably mounted in an enclosure or frame 11. Associated with the cylinders are two screws 12 and 12', each of which operates a carriage 72, composed of some dielectric material and, in addition, associated with the cylinders is a revolution counter 59. The cylinders 10, and 10', being revoluble, a locking device, generally indicated by the reference character 14, is provided whereby both the cylinders may be simultaneously locked from being operated, or, whereby one or the other of the cylinders may be locked from being operated while the other may be free to be operated, or, whereby both cylinders may be unlocked and be free to be operated together and in unison. The locking device, in this instance, comprises two oppositely disposed cylinder locking members 14', pivotally mounted centrally between the two cylinders on fulcrums 14", secured in upstanding lugs 15, fastened, as by means of screws 15', to the bottom of the enclosure 11, as shown. The upper end 16, of each of the locking members is adapted to lockingly engage a notch or recess 17, suitably located in the end of each of the cylinders as shown. Both of the locking members may be simultaneously held in locking engagement with said recesses 17, by means of, in this case, springs 18, connected to the members and to the floor, or bottom 19, of the enclosure, by means of respective screws 20, as shown. Between the two locking members 14', is located a revoluble cam 21, which is adapted to be rotated in a manner to cause the locking members to be disengaged from their respective cylinder locking position, or, the cam may be so rotated as to cause one or the other of the locking members to be disengaged from its cylinder locking position whereby one or the other of the cylinders, as the case may be, will be unlocked and be free to be rotated. However, when it is desired to operate both cylinders simultaneously and in unison, both locking members are to be disengaged from their locking position in the said recess of its respective cylinder. The cam 21 being properly located is rigidly fastened, as by means of a set-screw 22, to an upstanding rod or shaft 23, which is revolubly mounted in respective bearings 24, and 25. And on the upper end of the rod 23, is fastened, as by means of a set-screw 26, a thumb piece or knob 27, by means of which, the said cam may be operated. On top of the knob 27, is disposed an arrow 28, to indicate the registered position of the said cam. For positioning the cam, in this case, a spring-actuated ball 29, together with its actuating spring 30, is employed. Through the cam is provided a tapped hole 31, which is adapted to retain the ball 29, so that the same will protrude slightly below the bottom of the cam whereby it may engage a recess or countersink 32, in the floor 19, of the frame, the recess being disposed in the longitudinal centerline of the frame in cooperative relation to the spring-actuated ball 29, which is arranged radially out from the center of rod 23, a suitable distance out on the longitudinal centerline of the frame and in line with the forward end of the arrow 28. Ninety degrees to the left, and to the right, of recess 32, and a like distance from the center of the rod 23, as that of recess 32, are, respectively, recesses or countersinks 33, 34, and 35, which are similar to that of recess 32, and in which ball 29, may be registered when one or the other of the cylinders 10 or 10', will be unlocked whereby the same may be operated. To back up spring 30, a suitable screw 31', is fitted into the tapped hole 31.

In practice, during resolving operations, both cylinders 10 and 10', the screws 12 and 12', and a revolution counter 59, are interconnected by means of a system of gearing and a disengageable friction clutch indicated, generally, by the reference character 35 and on Fig. 1. The clutch, in this case, being of the conical type, comprises a member 36, fastened, as by means of a pin 37, to shaft 38, which is splined through one or the other of the hubs 39, of cylinder 10. The spline 40, in this case, being similar to a Woodruff key, is fitted to shaft 38, which is provided, on its outer end, with a thumb-piece or knob 41, being fastened thereto by means of a pin 42. It will be noted that shaft 38, is journalled, at its left hand end, in a bore 43', in bearing-bracket 43, and at its right hand end, through a bore 44, formed in the end wall 45, of frame 11. Bracket 43, may be detachably secured to floor 19, by any suitable means. On the inner side of wall 45, is formed a boss 46, through which the bore 44, extends. Upwardly from boss 46, is formed a boss 47, through which is tapped a drilled hole 48, and into the hole 48, is inserted a spring-actuated ball 49, which is adapted to engage annular grooves 50 and 51, formed in shaft 38, in cooperative relation to said ball 49. The grooves 50 and 51, being so arranged that when the clutch member 36, is moved into engagement with its opposite correlative member 36', being a hub extension on gear 52 the said gear 52 being loosely mounted for rotation on shaft 38. Actuating the ball 49, is a spring 49', which is held against the ball by means of a screw 49", which is threaded into the tapped hole 48. When the shaft 38, is pushed inwardly carrying clutch member 36, along with it until the same is frictionally in engagement with its opposite correlative member 36', the pressure of the ball against a countersink 51, will be sufficient to prevent the clutch members from becoming disengaged from each other. And, the withdrawal of the clutch members from engagement with each other, by means of shaft 38, the gear 52, will be free to run idle on the shaft. The shaft being withdrawn until the ball engages a countersink 50, whereby to hold the clutch members 36 and 36', apart from each other. In order to prevent cylinder 10, and gear 52, from being moved longitudinally on withdrawing shaft 38, to disengage clutch member 36, from correlative member 36', a stop 10", is provided and fastened, as by means of screws 9, to the side wall of frame 11, as shown.

Like cylinder 10, cylinder 10', is carried by a shaft 38', which is journalled, at its left hand end, in a bore 43', in bearing-bracket 43, and at its right hand end, through a bore 44', formed in the end wall 45, of frame 11. On the outer end of shaft 38', is provided a thumb piece or knob 41', which is secured to the shaft by means of a pin 42. Cylinder 10', being keped to shaft 38', by means of a key 38"', is held from longitudinal movement between the bearing-bracket 43, and gear 52', which is secured to shaft 38', by means of a key pin 53, driven through hub 52", of the gear, and the shaft. A set collar 53', being pinned to the shaft and against boss 46', as shown, prevents any outward longitudinal movement of the shaft 38', or of the cylinder 10'.

As shown, gears 52, and 52', are interconnected by means of an intermediate gear 54, being securely fastened by means of key pin 54', to a shaft 55, which is revolubly mounted in the wall 45, and a bracket 60. The screws 12 and 12', being journalled in bearing bushings 56, secured in the end walls 45, of frame 11, are interconnected, respectively, to cylinder 10, and 10', by means of respective gears 57 and 58, and 57' and 58'. Gears 57 and 57', are secured, as by means of screws 38''', to respective cylinders 10, and 10'. The gears 57 and 57', are disposed between respective cylinders 10 and 10', and the bracket 43.

Centrally intermediate the cylinders 10 and 10', is disposed a resettable revolution counter 59, the same being mounted in the upper right hand end of frame 11, upon a bracket 60, which may be detachably secured to the floor 19, of frame 11, by any suitable means. Secured to the spindle of the counter, at the left hand end thereof, is a knurled wheel 61, which may be used to reset the counter. And to the spindle of the counter, which extends out from its right hand end, is secured a gear 62, which is adapted to mesh with a driving gear 63, securely fastened to said shaft 55, by means of key pin 55'.

To the left hand end of each of the cylinders 10 and 10', which may be formed from the strips or helical electrical conductors 65 is attached, or forming a part of metallic bands 64 and 64' respectively. The said cylinders may be constructed from some suitable tubular dielectric material. And it may be here suggested that each of the helical electric conductors 65, may be made from narrow strips of thin metallic material of proper length, the same being disposed in a corresponding helical recess formed around each of said cylinders throughout their length. Each of the strips have raises or radial projections 66, formed therein at certain prescribed intervals, the intervals representing the logarithmic equivalents of two pairs of numbers which may be, for instance, 65:43, which, during the operation of resolving gear ratios, may appear on cylinder 10, and, possibly, a different set of numbers, such as 82:74, may appear on cylinder 10'. The set of numbers 65:43, appearing on cylinder 10, may represent the desired number of teeth required in a pair of driving gears, while the set of numbers 82:74, appearing on cylinder 10', may represent the desired number of teeth required in a pair of driven gears. The combination of the above set of driving and driven gears gives a required ratio of .46067 to 1. Actually the ratio is .460613 to 1. The spacing of the raises or projections 66, from one to the other, such as may be required, and the pairs of numbers co-adjoining them, are, respectively, identical to each other, space for space, and numbers for numbers, on the two said helices.

To electrically connect the helices of one cylinder to the helices of the other cylinder, a U-shaped piece of spring bronze, or other suitable material, 67, is mounted, so as to make frictional engagement with bands 64 and 64', onto the bracket 43, with a thin piece of dielectric material placed between it and the bracket 43, and fastened there by means of screws made from some dielectric material 68.

Slidingly mounted on supports or electrical conductor has bars 69, disposed on each side of the longitudinal centerline of the housing 11, and secured in the end walls 45, of the enclosure or housing 11, through dielectric bushings 69', are travelling electrical conductors, indicated, generally, by the reference character 72, which are adapted to make electrical connection between a projection 66, on a helical electric conductor disposed on one of the cylinders, to that of a projection 66 on the other helical electric conductor disposed on the other cylinder, only when the proper combinations of numbers have been reached. An electric lamp 73, being interposed in the circuit, will light only when the proper combinations of numbers have been reached. The said travelling conductors 72, are each provided with a resilient metallic contactor 72', the same being adapted to make contact with a projection 66, and complete the circuit when the same have come into proper co-operative relation to each other. Each of the said conductors 72, are operatively connected to its respective screw 12 or 12', by means of adjustable respective nuts 74, being detachably secured to conductor or carriage 72, by means of screws 75, and the nut clamping yokes 74'.

Centrally located at the bottom of frame 11, along its sidewall 45', is formed a pocket 76, into which an electric (flash light type) battery 77, may be installed. And, in the left hand end of cover 70, is formed an opening 78, in which electric lamp 73, together with its accompanying receptacle, may be installed. Also in the left hand end of the cover is installed a snap switch 79, and a spring-return push button switch or contactor 80. And, longitudinally in cover 70, and centrally arranged with respect to the axis of cylinders 10, and 10', are formed slots 81, through which inspection may be made as to the respective relative positions of the carriages 72, are to each other, and of the numbers which may appear through opening 72'', disposed centrally through each of the carriages. Also, the cover is provided with an opening 70', directly over the counter 59, through which inspection may be made of the numbers appearing on the counter, and also to provide access to counter reset wheel 61. Cover 70, is held in place by means of inverted screw bolts 82, inserted through openings 83, in the bottom 19, of frame 11, and screwed to the cover as shown, and, also, dowels 84, are provided to prevent the cover from shifting from its bolted location.

Figures 5, 7:
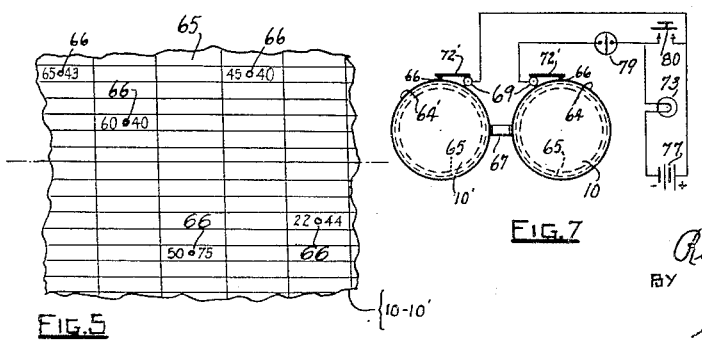
Figure 5 is an enlarged development of a portion of the peripheral surface of one of the cylinders illustrating the relation of the helical electrical conductor to the pairs of numbers above mentioned.
Figure 7 is a diagrammatic view of what may be included in the electric circuit; and, Figure 8 is a fragmentary sectional view of a cylinder which may be formed from a dielectric material wherein a helical recess may be formed in which a helical metallic strip, having radial projections and their associate numbers formed thereon, may be arranged.

Referring to the diagrammatic view of the electric circuit, Figure 7, it will be seen that in closing switch 79, the circuit is completed through lamp 73, guide 69, contactor 72', projection 66, helical conductor 65, band 64, U-shaped piece 67, band 64', helical conductor 65, contactor 72', guide 69, and electric battery 77; and, for lamp and/or battery testing, switch 80, is momentarily closed shorting out the circuit previously mentioned.

Before starting resolving operations, both travelling conductors 72, with their contactors 72', fastened in place by means of screws 72''' must be in identical relative positions at the left hand end of the machine. To accomplish this, both cylinders are turned, in this case, counter-clockwise until the cylinder gears 57, and 57', being in mesh, respectively, with screw gears 58, and 58', have caused the respective screws (having left hand screw threads) to operate the carriages with their contactors 72', to the desired identical starting positions which may be at either the left or right hand end of the cylinders as the case may require. Having thus located the contactors 72', say at the left end of the cylinders 10 and 10', it will become necessary to lock both cylinders against rotation. This is accomplished when the arrow 28, shown on the top surface of thumbpiece 27, which is secured on upper end of shaft 23, of locking device 14, points toward the word "Set," as shown. Both cylinders being locked, the counter 59, should now be set to (0.0000) by means of the counter clearing or reset wheel 61. This having been done, one of the cylinders, in this instance, cylinder 10', may be unlocked and advanced, or rotated, to a desired ratio, or the ratio sought, while setting the counter to the logarithm of, say, ratio (.46067 to 1) for instance, or log. 9.6633. During this operation the carriage with its contactor 72', has also advanced, by means of screw 12', to an identical amount, or in correlation to the number of helices, or portions thereof, of the helical electric conductor, 65. After the completion of this operation, first engage the clutch members 36 and 36', then unlock cylinder 10, whence both cylinders 10, and 10', may be operated simultaneously by turning either knob, 41 or 41', in this case, clockwise until the electric circuit has been completed, by which the signal lamp 73, will light, indicating that the proper combination of a set of driving gears, and a set of driven gears, have been resolved which approximate the ratio desired.

Should ratios greater than one to one (1:1) be desired, as for instance, 4.5982 to 1, the carriages, with their contactors 72', are brought to their limits at the right hand end of the machine, instead of to their limits at the left hand end thereof, as in the case of, for ratios of less than on to one (1:1). The operation of the cylinders or helices, with their associated radially raised projections 66, in resolving for gear ratios greater than one to one (1:1), should be the reverse of that when resolving for gear ratios less than one to one (1:1).

Relative to the electrical circuit shown in Figure 7, of the drawings. This electric device is to provide a signal, or warning, to the operator of the machine, as by means of a light, from an electric lamp, in this case, that there are two sets of figures, or numbers, in line as, for instance, 50×75, and 51×74; these, therefore, will provide the answer to the problem that the machine is solving.

As to the "counter 59," it is provided for counting logarithmic numbers and they should be read directly as a logarithm.

Figure 3:
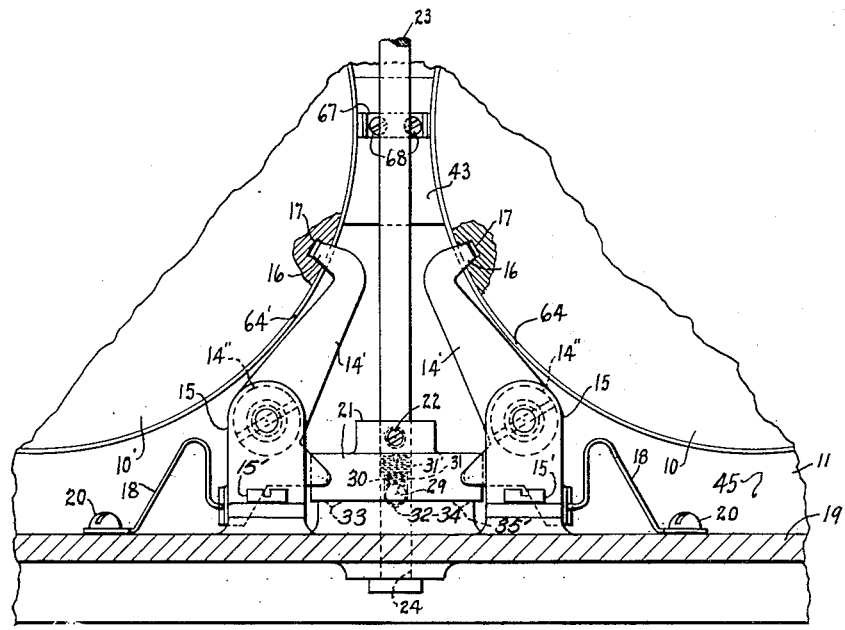
Figure 3 is, substantially, a sectional view of Figures 1 and 2, as seen from the plane 3—3, and shows the cylinder locking device on a larger scale.
Figure 6:
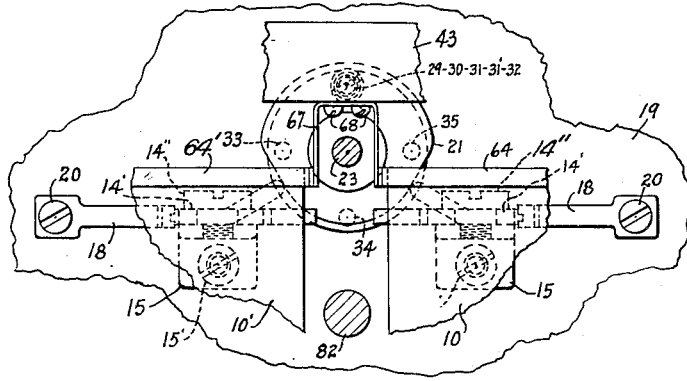
Figure 6 is a plan view of Figure 3, and substantially on the same scale.
Figure 8:
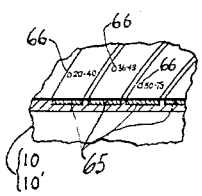

With reference to the friction clutch 35. It is used to lock the cylinders 10, and 10', together after the contactors 72', have been properly located so that resolving operations may be begun, as previously stated. And, the purpose of the cylinders 10, and 10', locking device or members 14', shown in Figures 3, and 6, of the drawings, is to align or lock said cylinders in identical starting positions while the counter 59, or logarithm indicator, is being set.

As to the spirals, or helices, it may be understood that they are linear, but the placing of the contacts or projections 66, is logarithmic. The word linear, here, is used in the sense that the first few numbers of a logarithm may be thought of as consecutive numbers, viz: 9.9854, 9.9855, 9.9856, etc., and when reading the "counter 59," the minus 10 (—10) is understood.

A simple analogy of the operation of the invention is as shown in the following diagram, thus:

Let A represent one cylinder (10) and B represent the other cylinder (10'); they both being alike have the same number of "linear" divisions. A is "set" similar to slide rule. The amount of offset is determined by the "counter 59," one number for every space. It will be noted, for instance, that if the number appearing on A, as 2, is subtracted from the number appearing on B, as 14, the numbers 14—2, 17—5, etc., the answer is the same in every case. In the above settng it equals 12, but the numbers may be arranged so as to read anything within the range of the machine.

To illustrate, dots at 4 and 9 appear on A, but the same dots, however, appear in the same places on both cylinders, if they were continued. These dots represent the contact points or projections 66, on the cylinders and represent the values of the pairs of numbers shown, such as, for instance, 50×75, etc. They are placed according to the logarithm value of their product, for instance, 50×75=3750, and 51×74=3774. The logarithm of 3750=3.5740 . . . , and the logarithm of 3774=3.5768 . . . , therefore: 3.5768—3.5740= 28. It may therefore be understood, that all desirable pairs of numbers within the scope of the machine may be represented by these dots, or, as stated, contact points or projections 66. Since, in the abovementioned numbers, the logarithm difference is 28, the dot representing 3774, will appear 28 spaces farther down the line than the dot representing 3750. And, if the dots shown were electrical conductors such as projections 66, and a wire or electrical conductor forming a portion of an electric circuit, were passed along the line and over a projection 66, it would complete, or close, an electric circuit between 9 and 21, and a signal or warning by, in this case, an electric light, and would indicate that a combination approaching the desired ratio existed. However, there could be no signal at 4, because there would be no desirable number pair representing that logarithm on the other cylinder. It is here further stated that the series of numbers as are arranged on the cylinders 10, and 10', merely represent a consecutive series of logarithms (base 10) arranged in a helix. Also, it may be understood, that instead of advancing the above-mentioned helix of one cylinder relative to the helix of the other or second cylinder, the advancing of one electrical contactor 72', in accordance with the number shown on the counter 59, would be the same as operating the other helix to an amount to produce the required combination of pairs of numbers associated with the contact points or raised projections 66, which would make and complete, or close, an electrical circuit. It is here further stated, that after locking or clutching the cylinders 10, and 10', in cooperative relation to each other, as above-stated, the counter 59, loses its significance, and when a circuit is completed, and a signal is given, as above-stated, means that two pairs of numbers, at this point, or moment, are of the desired relationship, or the gearing ratio required.

Having thus described the invention, it may be readily understood that the minor details of its construction may be altered in several ways without departing from the spirit and scope of the

| | | | 1 | 2 | 3 | 4. | 5 | 6 | 7 | 8 | 9. | 10 | 11 | 12 | 13 | 14 | ←A |
|---|---|---|---|---|---|---|---|---|---|---|---|---|---|---|---|---|---|
| 7 | 8 | 9. | 10 | 11 | 12 | 13 | 14 | 15 | 16 | 17 | 18 | 19 | 20 | 21. | 22 | 23 | 24 | 25 | 26 | ←B | invention, and without losing any of its attendant advantages. Therefore, what is claimed is desired to be secured by Letters Patent.

I claim:

1. In combination, an electric circuit, a pair of cooperating revoluble gear ratio resolving metallic cylinders having suitably spaced, radial projections suitably formed thereon in a helical path of uniform pitch, a set of numbers arranged correlatively adjacent to each of said projections, said numbers corresponding to the number of teeth in each of a set of driving gears and in each of a set of driven gears, screw operated carriages arranged in cooperative relation to each of said cylinders and the said projections, the said carriages each having an electrical conductor disposed thereon, the same being arrangeable whereby to make contact with a certain projection on each of said cylinders, screw carriage-propelling means arranged in cooperative relation to each of said cylinders and the said carriages, cylinder locking means comprising spring-actuated cam-operated pawls, a disengageable friction clutch associated with one of said cylinders, a revolution counter arranged in cooperative relation of said cylinders, a system of gearing with which to interconnect the above-mentioned cylinders, and the carriage operating screws in cooperative relation to each other included in the said electrical circuit are the said cylinders, said projections, and said conductors, and a U-shaped electrical conductor frictionally engaging said cylinders through the medium of an attached collector band arranged in electrical cooperative relation to said projections, and a frame or inclosure in which to mount said mechanism.

2. The combination in a gear ratio resolving mechanism, of an electric circuit, a pair of substantially identical revoluble metallic helices of uniform pitch disposed around the peripheral surface of each of a pair of cylinders arranged in revoluble cooperative relation to each other, the said helices forming a portion of said electric circuit together with its attached collector bands, and having formed thereon, at suitable intervals throughout their extent, raised or radial projections; the same being arranged in a helical path about said cylinders, longitudinally moveable electrical conductors arrangeable to contact said projections, screw means for moving said conductors transversely of said helical paths, a revolution counter, a system of gearing with which to interconnect the above-mentioned mechanism, a set of figures arranged adjacent each of said projections, and a frame or enclosure in which to mount the above-mentioned mechanism.

3. In combination, a gear ratio resolving machine having an electric circuit in which is included a pair of identical revoluble metallic cylinders having helically arranged and spaced apart radial projections disposed thereon, and having two pairs of numbers arranged in correlation to each of said projections, a re-set revolution counter arranged in cooperative relation to said cylinders, screw operated longitudinally operable electrical conductors arranged to engage said projections as disposed on said cylinders, screw means for operating each of said conductors, a system of gearing with which to operatively interconnect said mechanism, and a frame or housing in which to mount the above-mentioned mechanism.

4. The combination in a gear ratio resolving mechanism, of an electric circuit, a pair of substantially identically arranged helical electrical conductors disposed in a helical path along the surface of each of a pair of cylinders arranged in cooperative relation to each other and forming a portion of said electric circuit, a re-set revolution counter arranged in cooperative relation to said cylinders, a set of figures and a series of helically arranged spaced apart raises or radial projections arranged in coadjacent relation to each other, an electrical contactor carrier arranged to operate longitudinally of each of said cylinders, revoluble screws for operating said contactors in cooperative relation to and in unison with the operation of the helical arrangement of said projections, cylinder locking means comprising a pair of spring-actuated pawls, a revoluble cam arrangeable to simultaneously lock said pair of cylinders against being operated, or for locking one or the other of said cylinders from being operated, or for unlocking both of said cylinders whereby the same may be operated simultaneously, a system of gearing by which to operatively interconnect said cylinders and said screws, a disengageable friction clutch detachably secured to one of said gears being associated with one of said cylinders, and an enclosure or frame in which to mount the above-mentioned mechanism.

5. The combination in a gear ratio resolving mechanism, of an electrical circuit, helically arranged electrical conductors disposed in a uniform pitch around the periphery of a pair of substantially identical revoluble cylinders mounted in cooperative relation to each other, said conductors comprising suitable metallic material having raised or radial projections disposed thereon at suitable intervals in a helical path, a set of figures disposed thereon in correlation to said projections, a revoluble screw having screw threads arranged in cooperative relation to said helical conductors, a screw operated conveyor having an electrical conductor secured thereon and arranged to make electrical connection with the said projections, forming a portion of an electrical circuit, the screw-threads on said screw to cooperate with the pitch or path of said helically arranged spaced apart projections, a U-shaped electrical conductor forming a portion of an electrical circuit, and arranged to frictionally engage said cylinders and form an electrical connection therebetween, and electrical signalling means, such as a flash-light bulb, arranged in circuit with said conductors and an electric battery, the said bulb flashing a light on the completion of the electrical circuit, above-mentioned, as the proper projections have been contacted by the said conductors.

6. In combination, an electrical circuit, a gear ratio resolving mechanism arranged in said circuit, the said mechanism comprising identical revoluble cylinders having helically formed metallic strips disposed there-around and having formed therein a helical arrangement of radial projections spaced a suitable distance apart throughout the entire extent of said strips, and having disposed thereon in correlation to said projections a set of numbers which correspond to the number of teeth required in a set of gears providing the required ratio of gearing for performing definite operations in a machine, a U-shaped metallic piece arranged in said circuit and adapted to frictionally engage said strips and form an electrical connection there-between, a screw propelled carriage having an electrical projection contactor secured thereon arranged to engage said projections, a screw for operating said carriage across said projections, a system of gearing arranged to interconnect and operate the said mechanism, a re-set revolution counter arranged in cooperative relation to said gearing, and cylinder locking means comprising spring actuated cam operated pawls arranged to control the operation of said strips, a disengageable friction clutch arrangeable for controlling the operation of one of said strips, an electric lamp, a pair of switches, and an electric battery included in said circuit, and an enclosure in which to mount said mechanism.

7. In combination, an electric circuit, a gear ratio resolving mechanism arranged in said electric circuit, an identical pair of metallic cylinders arranged in cooperative relation to each other and forming a portion of said circuit, an arrangement of radial projections formed at certain prescribed intervals on said cylinders, the said projections arranged in a helical path of uniform pitch thereon, means to electrically connect said cylinders to each other through the medium of a U-shaped piece formed to frictionally engage both of said cylinders and forming a portion of an electric circuit, screw propelled carriages, an electrical conductor secured on each carriage arranged so as to engage said projections as disposed around each of said cylinders whereby to complete an electrical circuit, revoluble screws having screw-threads formed to correspond relatively to the pitch of the helical arrangement of said projections, a pair of correlative spring-actuated cylinders locking members or pawls, a revoluble cam arranged to operate said pawls into or out of locking engagement with said cylinders, a disengageable friction clutch for controlling the operation of one of said cylinders, a revolution counter arranged in cooperative relation to said cylinders, a system of gearing with which to operatively connect said cylinders, said screws, and the said counter in co-operative relation to each other, and the said clutch arranged in co-operative relation to said gears, a pair of electric switches, an electric lamp, an electric battery arranged in said circuit, and an enclosure in which to mount said mechanism.

8. The combination in a gear ratio resolving mechanism, of an electrical crcuit, a pair of revoluble metallic cylinders arranged in cooperative relation to each other and arranged in an electric circuit, a system of gearing for controlling the operation of said cylinders, the said cylinders each having identical helical recesses formed therein, a metallic strip arranged in each of said recesses, the said strips each having raised or radial projections formed therein and spaced apart in identical prescribed intervals throughout their extent, two pairs of numbers arranged on said strips adjacent said projections, an annular metallic band disposed on like ends of each of said cylinders and the same being arranged in said circuit and electrically connected to said strips, the said cylinders being electrically connected to each other by means of a metallic U-shaped piece being arranged in said circuit and frictionally adapted to engage the said band or cylinder, pivotally mounted spring actuated cylinder locking members or pawls, a revoluble cam for operating said pawls from locked engagement with one or the other of said cylinders, or from both simultaneously, a friction clutch disengagedly secured to one of said cylinders, a re-set revolution counter arranged in cooperative relation to said cylinders through the medium of said system of gearing, screw propelled carriages each having an electrical conductor secured thereto and arranged to engage any of said projections and complete an electric circuit the said carriages being mounted for longitudinal movement over each of said cylinders, revoluble screws for controlling the operation of said carriages, the said screws being so formed as to provide movement of said conductors in time and in unison with the pitch of the helical path or arrangement of said projections, a pair of electrical switches, an electric lamp, and an electric battery, arranged in said circuit, and an enclosure in which to mount the above-mentioned mechanism.

9. The combination in a gear ratio resolving mechanism, of an electric circuit, a revoluble uniform metallic helical arrangement of raises or projections spaced a prescribed distance apart on a pair of revoluble metallic cylinders and having an arrangement of numbers disposed thereon associated with said projections, the said numbers representing in one instance the required number of teeth in a set of driving gears, and in another instance the required number of teeth in a set of driven gears, the said raises arrangeable, together with travelling electric conductors whereby to complete an electric circuit, electric conductors or bus bars providing supports for the said travelling conductors, a revolution counter for indicating the required gearing ratio, the said counter being arranged in cooperative relation to said projections and numbers through the medium of an arrangement of interconnected gearing, and screw-propelled electrical conductors arrangeable to make contact with the desired said projections whereby to complete an electric circuit through said projections, an electric signalling lamp, an electric battery and one of a pair of electric switches when the proper gear ratio is resolved.

10. In combination, an electric circuit, a gear ratio resolving mechanism arrangeable to complete an electric circuit, the same comprising a pair of revoluble metallic cylinders, a helical arrangement of raises or projections spaced a prescribed distance apart in a helical path disposed on each of said cylinders and having an arrangement of numbers associated with said projections, a resilient metallic U-piece arranged to electrically connect said cylinders to each other and form a portion of said electric circuit, the said numbers representing in one instance the required number of teeth in a set of driving gears, and in another instance the required number of teeth in a set of driven gears, a re-set revolution counter arranged in cooperative relation to said cylinders, screw propelled electrical conductors, electrical conductors or bus bars for supporting said propelled conductors, a system of interconnecting gearing arranged to operably connect said cylinders and counter in cooperative relation to each other, the said counter arrangeable to indicate the logarithmic equivalent of the desired gear ratio to which one of said propelled conductors should be set, and screw propelled electrical conductors arranged in said circuit and arrangeable to make contact with the desired projections whereby to complete the electric circuit through said projections, said bus bars, the said U-piece, an electric lamp, and electric battery, and one of a pair of electric switches when the proper gear ratio is resolved.

11. The combination in a gear ratio resolving mechanism, of an electric circuit, a pair of identical revoluble metallic cylinders forming a portion of said circuit, an arrangement of numbers of logarithmic values disposed in space relation in a helical path around each of said cylinders, a helical arrangement of spaced raises or projections disposed on each of said cylinders in correlation to the said numbers and forming a portion of said circuit, travelling electrical conductors arrangeable to form a portion of said electric circuit in conjunction with said projections, revoluble screws for operating the said travelling conductors, an electrical conductor comprising a U-piece arranged to electrically connect said cylinders to each other and form a portion of said electric circuit, electrical conductor or bus bars providing a support for each of said travelling conductors and forming a portion of said circuit, a re-set logarithmic revolution counter arranged in cooperative relation to the above-mentioned mechanism, a system of gearing with which to operably connect said cylinders, the said counter, and said revoluble screws together, a source of electrical current, an electric lamp, and an electric switch included in said circuit, and a housing in which to mount the above-mentioned mechanism.

RUSSELL H. STOUT.

REFERENCES CITED

The following references are of record in the file of this patent:

UNITED STATES PATENTS

| Number | Name | Date |
| --- | --- | --- |
| 1,149,143 | Jacobson | Aug. 3, 1915 |
| 1,306,379 | Horine | June 10, 1919 |
| 2,375,878 | Willens | May 15, 1945 |